United States Patent [19]

Stalter, Sr.

[11] 3,855,653

[45] Dec. 24, 1974

[54] METHOD OF MAKING A MATTRESS AND SAID MATTRESS

[75] Inventor: Robert J. Stalter, Sr., Bowling Green, Ohio

[73] Assignee: The Goodyear Tire & Rubber Company, Akron, Ohio

[22] Filed: Sept. 17, 1973

[21] Appl. No.: 397,512

[52] U.S. Cl. ..................... 5/351, 5/353, 297/DIG. 2
[51] Int. Cl. ......................... A47c 23/04, A47c 7/14
[58] Field of Search ......... 264/45; 297/452, DIG. 1, 297/DIG. 2; 5/351, 353–355

[56] References Cited
UNITED STATES PATENTS
3,459,611 8/1969 Joseph et al. ........................... 5/351
3,480,703 11/1969 Moritz et al. .................. 297/DIG. 1

FOREIGN PATENTS OR APPLICATIONS
994,021 7/1961 Great Britain ................ 297/DIG. 1

*Primary Examiner*—Casmir A. Nunberg
*Attorney, Agent, or Firm*—F. W. Brunner; J. D. Wolfe

[57] ABSTRACT

A polyurethane foam encapsulated spring mattress assembly having a set of springs enclosed in a fabric envelope positioned within the mattress and covered with an open cell polyurethane foam, said envelope being covered with polyurethane foam while the springs are compressed.

2 Claims, 4 Drawing Figures

PATENTED DEC 24 1974 3,855,653

3,855,653

METHOD OF MAKING A MATTRESS AND SAID MATTRESS

This invention relates to an improved foam innerspring mattress or cushion-type material. More particularly, this invention relates to a foam innerspring mattress wherein during the forming of the mattress the innersprings are foamed in place under compression. Mattresses containing innersprings have been available on the market for a number of years. With the advent of the better grade polyurethane foams, full foam polyurethane mattresses have captured a segment of the market. Each of the type mattresses, i.e. innerspring and the polyurethane foam mattresses have certain attributes that are desirable but heretofore have not been able to obtain these benefits when it was attempted to utilize polyurethane foam and innersprings conjointly, without excessive labor costs.

An object of this invention is to provide a polyurethane foam innerspring mattress wherein the mattress is fully molded in one piece with the springs in place and under compression.

The above object and advantages of this invention may more clearly and readily be seen by reference to the drawings wherein.

Figure 1:
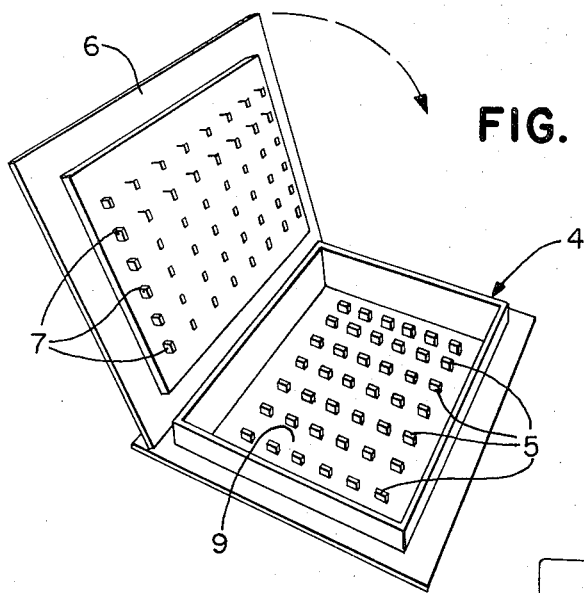
FIG. 1 is a perspective view of an open mold.
Figure 3:
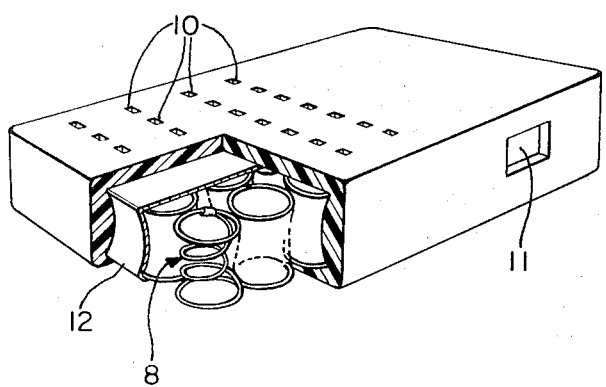
FIG. 3 is a perspective view showing part of the foam stripped away to expose the innerspring to show more specifically the construction of this embodiment of the invention.
Figure 4:
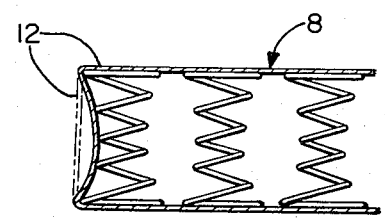
FIG. 4 shows a cross-sectional view through a fabric enveloped bed spring.

Referring specifically to FIG. 1 it can be noted that the numeral 4 indicates a rectangular box type mold having projections 5 extending upward from the bottom thereof and numeral 6 indicates the cover or lid for the mold having parts 7 projecting downward from the lid. In this embodiment a bed spring 8 of any of the well-known types such as those shown in FIGS. 3 and 4 is placed within the cavity 9 of the lower mold part 4 to rest on the projection 5. Before placing the metal coil spring inside the mold, the metal spring parts are covered with a fabric member 12 to envelope the springs in the manner shown in FIG. 4 and normally known as covering a spring with fabric to give a relatively tight fit of the fabric around the spring. The fabric envelope reinforces the foam and serves as a barrier to prevent foam from filling the cavities in and around the coil springs. Fabric porosity is selected for controlled bleed-through of foam to bond the springs to the fabric.

A suitable foamable polyurethane reaction mixture is distributed within the cavity of the mold. Preferably the foamable mixture is applied in the bottom of the mold before the spring unit is added. The spring unit is placed in the cavity and rests on the projections. A second pour is distributed on top of the spring unit. The lid is closed whereupon the projections 5 and 7 respectively in the box and lid plate compress the spring unit at least about 0.5 to 6 percent and preferably 1 to 4 percent of the spring's original height.

Figure 2:
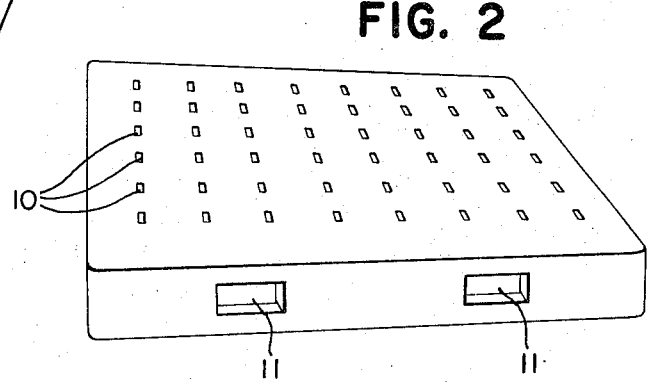
FIG. 2 is a perspective view of the mattress as it is removed from the mold.

After the polyurethane foam has cured, the mold is opened and the mattress is removed from the mold to give a cured product of the type shown in FIG. 2, which may have, if desired, core holes 10 and 11. Alternately the core holes may be eliminated by suitably eliminating the core members in the box and lid of the mold. When the foam covered innerspring mattress is removed from the mold the springs are able to return to their normal unstressed condition to give a foam mattress having a slightly enlarged gauge dimension over that of the cavity of the mold. The degree of enlargement is a function of the degree of compression during molding and the load bearing characteristics of the springs.

The following representative example illustrates the advantages of making a polyurethane foamed covered spring mattress, cushion or seats by this method wherein all parts and percentages are by weight unless otherwise indicated.

EXAMPLE

Coiled tapered springs assembled into an osterperipheral enclosed wire bed spring assembly was covered with a nonwoven long filament polypropylene fabric by forming a rectangular cover and slipping the cover over the bed spring assembly. Then the open end of the rectangular cover was sewn together to give a fully fabric enveloped set of springs.

This fabric covered bed spring assembly was placed in the box mold having upward projection support to give a space of 3 inches between fabric and the side of the box mold. A liquid polyurethane foamable reaction mixture was charged into the mold to give between 5 and 25 percent overfill of the space between the fabric covered bed spring assembly and the sides of the closed mold, when the foamable mixture has foamed and cured. The lid is closed and locked. The foamable mixture is allowed to foam and cure at room temperature although cures at 100° to 200°F. can be advantageous in some instances to give the foam covered springs.

The mold is opened and the molded foam filled inner spring mattress is removed from the mold. The foam has a density of about 2.5 to 3.5 pounds per cubic foot and the mattress is about 1 inch thicker than the dimension of the mold box due to expansion of the springs.

One of the many suitable liquid polyurethane foamable mixtures for covering or encapsulating the wire springs is as follows:

- 100 parts of a blend of 70 percent 6,500 molecular weight polypropylene ether triol and 30 percent 6,500 molecular weight polypropylene ether triol grafted acrylonitrile
- 2.7 parts water
- 0.02 parts dibutyl tin dilaurate
- 0.08 parts bis-(amino alkylene) ether of about 3 to 5 carbons per alkylene radical
- 0.08 parts N-ethyl morpholine
- 0.17 parts triethylene diamine
- 0.03 parts of 5 centistokes Silicone oil; and
- 105 percent based on the theoretical reactive hydrogen value of triol and water of a blend of 80 parts commercial 80/20 isomeric 2,4/2,6 toluene diisocyanate and 20 parts of a polyarylpolymethane isocyanate available commercially under the trade designation of PAPI.

In the above example a preferred polyurethane foam recipe has been used to exemplify the invention. The other well known mattress grade polyurethane foams of the polyether polyol-organic polyisocyanate or polyester polyol organic polyisocyanate types can be used, too.

Likewise, the preferred fabric envelope material has been used in the above example but it should be understood other well known fabric such as cotton, polyester, polyacrylic, polyamide glass fibers, etc. can be used.

While certain representative embodiments and details have been shown for the purpose of illustrating the invention, it will be apparent to those skilled in this art that various changes and modifications may be made therein without departing from the spirit or scope of the invention.

What is claimed is:

1. A polyurethane foam encapsulated spring mattress assembly, including a set of springs enclosed in a fabric envelope positioned within the mattress and covered with an open celled polyurethane foam, said envelope fitting the set of springs tightly when the mattress is unloaded, said foam being under compression when the springs are unloaded as well as when the springs are loaded.

2. The assembly of claim 1 wherein the springs have expanded at least 0.5 percent in thickness after being covered with foam.

* * * * *